Dec. 17, 1946.  F. G. ALBIN  2,412,553
HIGH FREQUENCY POWER GENERATOR
Filed June 25, 1943  2 Sheets-Sheet 1

FREDERICK G. ALBIN,
INVENTOR.

BY
ATTORNEY.

Dec. 17, 1946.    F. G. ALBIN    2,412,553
HIGH FREQUENCY POWER GENERATOR
Filed June 25, 1943    2 Sheets-Sheet 2

FREDERICK G. ALBIN,
INVENTOR.

BY
ATTORNEY.

Patented Dec. 17, 1946

2,412,553

UNITED STATES PATENT OFFICE 2,412,553

HIGH-FREQUENCY POWER GENERATOR

Frederick G. Albin, Los Angeles, Calif., assignor to Radio Corporation of America, a corporation of Delaware Application June 25, 1943, Serial No. 492,248

18 Claims. (Cl. 250—36)

This invention relates to electrical current oscillation generators and particularly to such generators adapted to supply high or radio frequency power for industrial purposes.

Radio frequency generators are well-known particularly for use in broadcasting systems where they are now almost universally employed. The types of these radio broadcast oscillator generators have varied in accordance with the power requirements. The present invention is a radio frequency oscillator or generator of this general type, but which has been specially conceived for use in general industry wherein high frequency power is desired for various purposes, such as wood gluing, drying, metal heat treating, and the like. It embodies novel features for the control of frequency and operation and particularly features which safeguard the operators as well as the generator equipment itself, while the mode of control has been simplified in the interest of ease of operation. It is highly efficient and stable in its generation of high frequency power, and may be readily adapted to various frequency ranges, such as from 2 to 10 megacycles, by utilizing the capacitances of the tubes as well as the capacitances which exist between various component parts of the mechanical structure. The control of the generator permits the frequency to remain substantially constant and independent of the controls of feedback and output power, while a special type of tank circuit capacitor serves also as a blocking condenser to isolate the direct current anode supply from the grid as well as serving as the grid capacitor itself. The novel condenser structure is disclosed and claimed in my copending application Serial No. 492,249, filed June 25, 1943.

The principal object of the invention, therefore, is to facilitate the generation of radio frequency power.

Another object of the invention is to improve the control and operation of radio frequency generators for industrial purposes.

A further object of the invention is to provide an improved high frequency generator with a minimum number of controls.

A further object of the invention is to provide a high frequency power generator having a variable capacitor which simultaneously serves as a grid capacitor, a grid blocking capacitor, and a means for varying the amount of feedback.

A further object of the invention is to provide a self biasing radio frequency power generator in which the feedback and output power may be varied while maintaining the frequency substantially constant.

A further object of the invention is to provide a high frequency power generator in which the tuning capacity is obtained from the capacitance existing between various portions of the mechanical structure thereof.

A further object of the invention is to provide a high frequency power generator embodying a plurality of safety controls for both the generator and the operators thereof.

Although the novel features which are believed to be characteristic of this invention will be pointed out with particularity in the appended claims, the manner of its organization and the mode of its operation will be better understood by referring to the following description read in conjunction with the accompanying drawings forming a part hereof in which:

Figure 1:
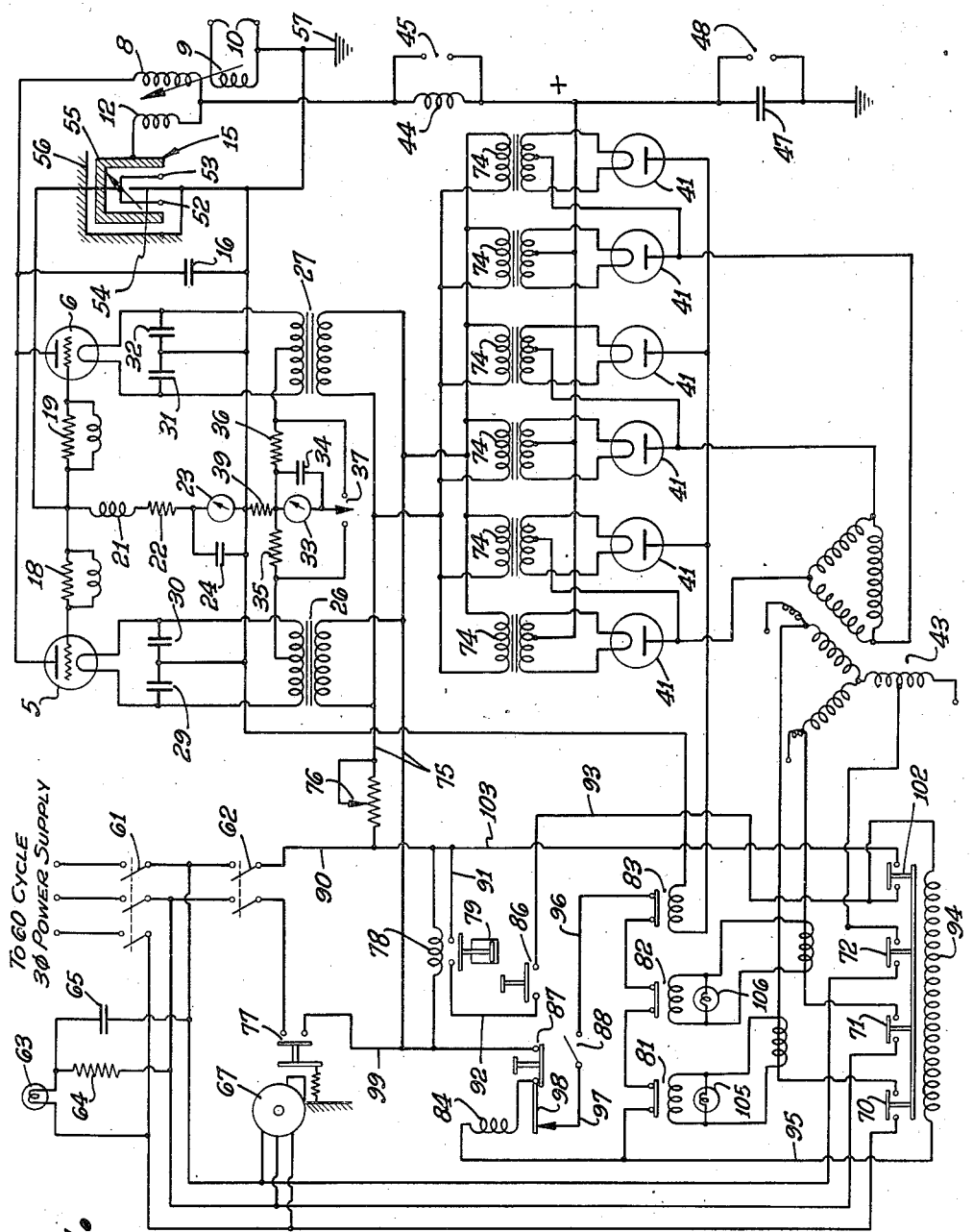
Fig. 1 is a schematic circuit diagram of a high frequency power generator embodying the invention.
Figure 3:
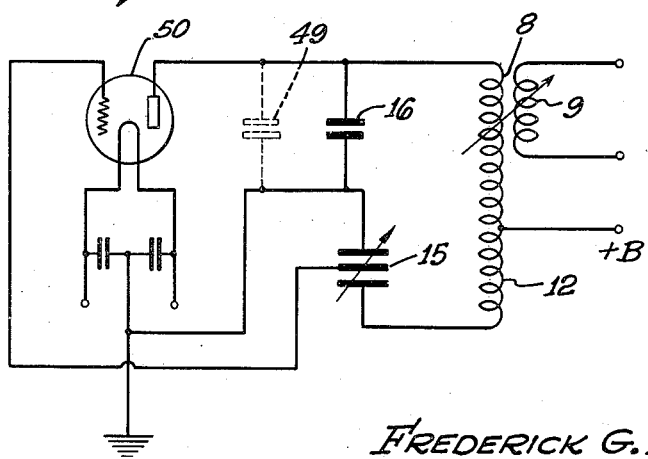

Referring now to Fig. 1, in the upper right-hand corner of the drawing, two high frequency oscillator tubes of the type known as RCA-892-R are shown at 5 and 6, these tubes being operated in parallel in the type of oscillator circuit known as the Colpitts circuit illustrated in Fig. 3. The anodes of the tubes 5 and 6 are connected together to one end of a tank circuit including a coil 8, a coil 12, and a special condenser 15. The coils 8 and 12 are coupled with the coil 9, the mutual inductance therebetween being variable to vary the power output of the oscillator to any desired load connected across terminals 10. The plate potential for the tubes 5 and 6 is impressed at a null point between coils 8 and 12. The special condenser 15 has three functions; namely, (1) it serves as a grid capacitance, (2) it serves as a blocking condenser blocking the direct current anode voltage from the grids, and (3) it serves as a variable voltage divider to regulate the amplitude of the voltage fed back from the tank circuit to the grids. The anode condenser of the Colpitts type of circuit is provided by condenser 16 which is supplemented by the stray tube capacitance as illustrated by the dotted line condenser 49 in Fig. 3.

The grids of the tubes 5 and 6 are coupled together through anti-parasitic oscillation circuits 18 and 19, respectively, to the variable plates of the special condenser 15. The grid biasing circuit is from the grids through a choke coil 21, a resistor 22, and a meter 23 for reading the grid biasing current. A protective condenser 24 is shown across the meter 23. The cathodes of tubes 5 and 6 are supplied with heating current from transformers 26 and 27, the high frequency circuit being connected to the cathodes over condensers 29, 30, 31, and 32. For the purpose of reading the plate current of the tubes, a meter 33 is provided with its protective condenser 34, the meter reading the plate current of tube 5 when the switch 37 is thrown to its left-hand position to shunt the meter across resistor 35, and the plate current of tube 6 when the switch is thrown to its right-hand position to shunt the meter across resistor 36. In the actual circuit, the switch 37 is also arranged to read the total plate current of both tubes 5 and 6 when shunted across resistor 39. The direct current anode potential is supplied from the 3-phase full wave rectifier including six rectifier tubes 41 of the type known as RCA–8008 connected to the delta secondary winding of a power transformer 43. A choke 44, shunted to ground by a protective spark or horn gap 45, is shown to safeguard the rectifier from high frequency power while a by-pass condenser 47 with its protective spark or horn gap 46 is also provided for the same purpose.

As mentioned above, the oscillator is of the basic Colpitts type illustrated in Fig. 3 wherein the condensers 15 and 16 of Fig. 1 are illustrated along with the inductances 8, 9, and 12, which determine the frequency of oscillation of the circuit. The dotted condenser 49 in shunt with condenser 16 represents the stray capacitance of the tube 50. The special condenser 15 is so constructed that the capacitance between the upper and lower electrodes is always a constant regardless of the position of the central electrode. The effective capacitance of the series combination of the condenser sections is equal to the product of the sections divided by the sum of the sections. The condenser, therefore, serves as the normal grid capacitor of the Colpitts type circuit and, in addition, serves as a blocking condenser for the grid and as a variable control of the feedback to obtain optimum efficiency of the oscillator with respect to the input-output power ratio and tube life.

Referring again to Fig. 1 and the diagram showing condenser 15 diagrammatically which, as mentioned above, is disclosed and claimed in my copending application, it will be noted that it is constructed of two variable interconnected plates 52 and 53, a center stationary plate 54, and a casing 55. Shown surrounding the casing on two sides is a metallic frame 56 connected to the stationary plate 54 and to ground at 57, while the casing 55 is connected to the coil 12. In this arrangement, condenser 16 is connected between the anodes and cathodes and the above relationship of condenser values set forth for Fig. 3 obtains, this particular circuit providing a high tank circuit capacity and a frequency in the lower range of predetermined frequencies to be generated.

Figure 2:
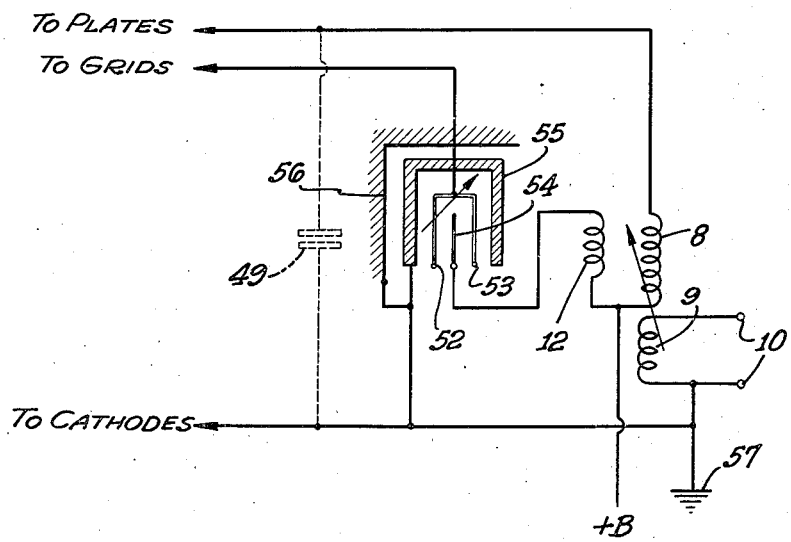
Fig. 2 is a partial diagrammatic view showing a circuit modification of the variable condenser employed in the circuit of Fig. 1, and, Fig. 3 is a schematic diagram illustrating the basic principle of oscillation involved in the generator.

Another manner of connecting this special condenser 15 is shown in Fig. 2 wherein the variable center plates 52 and 53 are again connected to the grids, but the casing 55 and frame 56 are connected together and to ground while the stationary central plate 54 is connected to the end of coil 12 of the tank circuit. With the special condenser so connected, a lower capacitance is provided and frequencies in the higher portion of the predetermined range are generated. In this arrangement, condenser 16 is not used and only the stray tube capacitance, as shown by the dotted condenser 49, is utilized, the relationship of condenser values being $C_{49}C_{15}/C_{49}+C_{15}$ equal to a constant. Thus, the generator, having a given set of coils, may be varied in frequency in any predetermined range by varying the connections as illustrated in Figs. 1 and 3.

Referring now to the left-hand portion of Fig. 1, a regular 230-volt, 60 cycle, 3-phase alternating current power supply is connected to the main terminals of a 3-pole switch 61 across two phases of which is a second 2-pole switch 62. A lamp 63, resistance 64, and condenser 65 are connected across the 3-phase power circuit for the purpose of indicating the proper direction of phase rotation as well as the power on all phases of the line. This indicating circuit is particularly desirable in view of the fact that a cooling fan 67 driven by a 3-phase motor for the anodes of the tubes 5 and 6 is provided, it being necessary that this fan be operated in the proper direction to do the necessary cooling. The 3-phase power circuit is also connected to a plurality of contacts 70, 71, and 72, which, when closed, connects the power to the Y-primary winding of transformer 43. This primary winding is shown Y connected because of the ease with which it may be tapped to provide different voltage ratios between the windings. By varying the transformer winding ratio, the proper anode voltage for the tubes 5 and 6 may be obtained from power sources of different voltages, or the power to the generator may be varied in this manner.

The closing of switch 62 will supply single phase power to cathode transformers 26 and 27 and to the rectifier cathode transformers 76 over conductors 75 in which a variable resistor 76 is provided for controlling the supply energy. The closing of the switch 62, however, will not energize the cathodes unless a blower operated switch 77 is closed, which switch will not be closed unless the blower 67 is operating in the correct direction. Also, if the blower ceases to function properly during the use of the generator, the switch 77 will be disconnected and the energy supplied to the cathodes interrupted, preventing overheating of the vacuum tubes.

The remaining portion of the drawing includes the start and stop controls for the generator and safety features for both the generator and the operators. To prevent voltage being applied to the tubes before they are properly conditioned, a time delay relay 78 having a dashpot 79 is provided while overcurrent relays 81, 82, and 83 prevent overcurrents from being applied to the tubes 5, 6, and 41. A locking out relay 84 prevents excessive cycling of the starting operation as will be explained hereinafter. A start switch is shown at 86 and a stop switch is shown at 87, while a door safety switch is shown at 88 to disconnect the power upon the opening of doors of the generator cabinet.

The starting operation will now be described. The closing of the 3-phase power switch 61 impresses power on the blower 67 and on contacts 70, 71, and 72 and on switch 62. If the phase rotation is correct and no phase is open, which will be shown by the lamp 63, the blower 67 will be operated in the proper direction and the switch 77 will close. The closure of the switch 62 will now energize the cathodes of the oscillator tubes 5 and 6 and the cathodes of the rectifier tubes 41. Closure of switch 62 also energizes delay relay 78 which, after a predetermined time interval, will close its contacts. When this is accomplished, the generator is ready to be further energized by the closing of momentary start switch 86 which completes a circuit from the right-hand terminal of filament switch 62, over conductor 90, conductor 91, the closed contacts of delay relay 78, conductor 92, closed start switch 86, conductor 93, the coil of relay 94, conductor 95, normally closed contacts of relays 81, 82, and 83, conductor 96, closed door safety switch 88, conductor 97, swinger 98, closed stop switch 87, conductor 99, closed blower contacts 77 to the left-hand terminal of switch 62. The energization of this circuit actuates relay 94, which closes its contacts 70, 71, 72, and 102. The closing of contacts 102 will lock the relay 94 over the circuit just traced and over conductor 103 which short circuits the momentary start switch 86 and permits the start switch to be released. The closing of contacts 70, 71, and 72 connects the power to the primary of transformer 43 and the tubes 5 and 6 will be supplied with anode potential from the rectifier. The generator will now oscillate at a frequency predetermined by the adjustment of the condensers 15 and 16 and the inductance of the coils 8 and 12.

Now, should the power line voltage and current increase beyond a safe value, either or both of the relays 81 and 82 will be energized and their normally closed contacts will be opened, thus breaking the energizing circuit for the relay 94 and removing the power from the transformer 43. Likewise should the rectified voltage and current unduly increase, relay 83 will break the holding circuit of relay 94.

It will be noted that connected across the winding of relays 81 and 82 are lamps 105 and 106, these lamps being provided for the purpose of preventing operation of these relays during the inrush transient current to the transformer 43. Otherwise, a condition of abnormally high plate transformer primary current persisting for a period of a fraction of a cycle of the 60-cycle supply current would actuate the relays. However, the thermal inertia characteristics of these lamps have been chosen so that an abnormally high current will operate the relays if it persists for more than approximately two cycles.

The function of the locking out relay 84 will now be described. In the event of an overload sufficient to operate any one of the overcurrent relays, the overcurrent is removed and the overcurrent relays return to their normally closed positions. When such an overload occurs while the start button is pressed, the contacts 70, 71, and 72 reclose, thus permitting the overload to be repeated. In this event, the cycle of opening and closing of the overcurrent relay contacts and contacts of relay 94 would be repeated so rapidly as to cause undue wear on the contactors. The function of the relay 84, therefore, is to hold open the control circuit of the relay 94 after the first overload has occurred. Thus, at the instant when one of the overcurrent relays operates because of overcurrent through its winding, a potential exists across its open contact and consequently current flows through the coil of relay 84 causing it to operate and open its normally closed contact 98 in series with the overcurrent relays and contactor coil as above-described. The impedance of the winding 84 is several times that of the winding 94, and the potential drop across the winding 84 is large leaving only a small voltage and current for the winding 94 which is insufficient to either actuate its contacts or close them, and consequently its contacts remain open and no connection is made between the power supply and the transformers 43.

Since the overcurrent relays are self restoring, they will close when the overcurrent is removed. However, the circuit is still held open by the relay 84 as long as the start button 86 remains closed. By releasing this start button the locking out relay 84 is restored to normal, its contact 98 is closed, and the control circuit closed to allow the normal operation of the relay 94.

It is to be understood that the start and stop buttons may be operated at a point remote from the cabinet housing the generator, such as at the point of application of the high frequency power, while the amount of power applied, which is controlled by the coupling between coils 8 and 9, may also be adjusted from a remote point by a control motor. Also, various warning lamps may be energized by the various circuits to indicate the operation of different relays and the fact that the generator is in operation.

I claim as my invention:

1. An oscillation generator circuit comprising a thermionic vacuum tube, an oscillatory circuit for said tube having an inductance and a plurality of capacitors connected in series, one of said capacitors being connected between the grid and cathode of said tube and a series pair of said capacitors being connected between the cathode of said tube and said inductance, another terminal of said inductance being connected to said anode, the ratio of the product of said first mentioned capacitor and said pair of capacitors with respect to the sum of said first mentioned capacitor and said pair of capacitors being constant and the total capacitance of said pair of capacitors remaining constant during variations in the individual capacitances of either of said pair of capacitors.

2. An oscillation generator circuit in accordance with claim 1 in which means are provided for varying said pair of capacitors to enable the ratio thereof to vary the voltage fedback from the output circuit of said oscillator to the input circuit thereof.

3. In a system for generating high frequency oscillations, the combination of a vacuum tube having an anode, cathode, and a grid, a low frequency energy source for heating said cathode, a rectifier for obtaining direct current energy for said anode from said source, a tuned circuit connected to said vacuum tube, said circuit including a tuning inductor connected to said anode, a fixed tuning condenser connected between said anode and cathode of said tube, and a variable sectioned condenser connected between said cathode and said inductor for varying the feedback between the output and input of said vacuum tube while maintaining the over-all capacitance of said tuning condenser at a substantially fixed value, said variable sectioned condenser including a fixed plate connected to said cathode, a fixed plate connected to said anode through said tuning inductor, and a movable plate intermediate said fixed plates connected to said grid.

4. In a system for generating high frequency oscillations, the combination of a three-phase low frequency energy source, an oscillator circuit including a vacuum tube having an anode, cathode, and a grid, said low frequency energy source supplying heating current to said cathode, a rectifier connected intermediate said oscillator circuit and said energy source for supplying direct current potential to said anode, means for cooling said tube, said means being energized from said low frequency source, means actuated by operation of said cooling means in a certain direction for connecting said low frequency energy source to said cathode, and means connected in said direct current potential circuit between said rectifier and said anode and in the circuit between said rectifier and said energy source for disconnecting said rectifier from said low frequency energy source.

5. In an oscillator system including a vacuum tube having an anode, grid, and cathode, and an inductance connected to said anode, a variable condenser having a fixed electrode connected to said cathode, movable electrodes connected to said grid, and a casing enclosing said electrodes connected to said inductance.

6. An oscillator system in accordance with claim 5 in which a metallic cabinet is provided for said system, said cabinet being electrically connected to said fixed electrode.

7. An oscillator system in accordance with claim 5 in which means are provided external of said casing for adjusting said movable electrodes between said fixed electrode and said casing, one direction of adjustment of said movable electrodes increasing the capacitance between said grid and said cathode while maintaining the capacitance between said cathode and said inductance substantially constant.

8. An oscillator system in accordance with claim 5 in which means are provided for adjusting said movable electrodes between said fixed electrode and said casing, one direction of adjustment of said movable electrodes increasing the capacitance between said grid and said cathode and simultaneously decreasing the capacitance by a substantially equal amount between said grid and said inductance.

9. In an oscillator system including a vacuum tube having an anode, grid, and cathode, and an inductance connected to said anode, a variable condenser having a fixed electrode connected to said inductance, movable electrodes connected to said grid, and a casing enclosing said electrodes, said casing being connected to said cathode.

10. An oscillator system in accordance with claim 9 in which a metallic cabinet is provided for said system, said cabinet being electrically connected to said casing.

11. An oscillator system in accordance with claim 9 in which means are provided for adjusting the position of said movable electrodes between said fixed electrode and said casing, one direction of adjustment of said movable electrodes increasing the capacitance between said grid and said cathode while simultaneously decreasing the capacitance between said grid and said inductance by a substantially equal amount, the capacitance between said cathode and inductance remaining constant at all times.

12. A high frequency power generator system including a thermionic vacuum tube, a frequency determining circuit therefor, means for supplying electrical power to said system, said means including a control relay, over-current relays having windings connected in the power supply circuit of said system for de-energizing said control relay and thus disconnecting said oscillator from said power supply, and a control circuit including a relay having a winding in shunt with the contacts of said overcurrent relays for preventing the energization of said control relay after deenergization thereof by the operation of any one of said overcurrent relays.

13. A high frequency power generator system in accordance with claim 12 in which the impedance of the winding of said last-mentioned relay is several times that of the winding of said control relay.

14. A system for generating high frequency oscillations comprising a vacuum tube having an anode, cathode, a grid, and an input circuit, a tuned circuit connected to said anode, cathode, and grid for determining the frequency of oscillation of said system, said circuit including a variable condenser connected between said grid and cathode of said vacuum tube, and an inductance connected directly between said anode and said variable condenser, said variable condenser functioning as a grid capacitance, a blocking condenser for said anode voltage, and a variable voltage divider to regulate the amplitude of the voltage fed back from said tuned circuit to said input circuit of said tube.

15. A system in accordance with claim 14, in which said variable condenser includes a plurality of sections, the total capacitance of said sections between said inductance and said cathode remaining constant during variations in the individual capacitances of said sections.

16. In a high frequency power generator system including a thermionic vacuum tube and an energizing circuit therefor, the combination of a control circuit for said energizing circuit, said control circuit including a plurality of slow-to-operate self restoring overcurrent relays adapted to disconnect said energizing source from said tube during overcurrent periods of a predetermined duration, and means for de-energizing said control circuit after said energizing circuit has been disconnected by any one of said overcurrent relays for preventing more than a single operation of said overcurrent relays during the overcurrent period.

17. In a system for generating high frequency oscillations, the combination of a vacuum tube having an anode, cathode, and a grid, a source of energy for said tube, a tuned circuit connected to said vacuum tube, said circuit including a tuning inductor directly connected to said anode, a fixed tuning condenser connected between said anode and cathode of said tube, and a variable sectioned condenser connected between said cathode, said inductor, and said grid for varying the feedback between the output and input of said vacuum tube while maintaining the over-all capacitance of said tuning condenser at a substantially fixed value.

18. A system in accordance with claim 17, in which the anode potential for said tube is connected to a null point on said tuning inductor.

FREDERICK G. ALBIN.